US010134304B1

United States Patent
Beals et al.

(10) Patent No.: US 10,134,304 B1
(45) Date of Patent: Nov. 20, 2018

(54) SCANNING OBSTACLE SENSOR FOR THE VISUALLY IMPAIRED

(71) Applicant: DISH Technologies L.L.C., Englewood, CO (US)

(72) Inventors: William Michael Beals, Englewood, CO (US); Jeffrey Lang McSchooler, Parker, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 15/645,735

(22) Filed: Jul. 10, 2017

(51) Int. Cl.
 *G09B 21/00* (2006.01)
 *G01S 13/93* (2006.01)
 *G01S 13/86* (2006.01)
 *G01S 13/08* (2006.01)
 *E01H 5/06* (2006.01)
 *G08B 7/06* (2006.01)
 *A61H 3/06* (2006.01)

(52) U.S. Cl.
 CPC ............ *G09B 21/006* (2013.01); *A61H 3/061* (2013.01); *E01H 5/066* (2013.01); *G01S 13/08* (2013.01); *G01S 13/86* (2013.01); *G01S 13/93* (2013.01); *G08B 7/066* (2013.01)

(58) Field of Classification Search
 CPC ...... G09B 21/00; G09B 21/006; G08B 7/066; G06F 19/00; A61H 3/061; A61H 3/06; G01S 13/08; G01S 13/86; G01S 13/96
 USPC ........... 340/539.11, 539.13, 473, 573.1, 944; 135/66; 455/556.1; 701/301
 See application file for complete search history.

(56) References Cited

U.S. PATENT DOCUMENTS

| 7,755,744 B1* | 7/2010 | Leberer ............... G01C 3/08 356/5.1 |
| 9,305,449 B2* | 4/2016 | Goszyk ................ A61H 3/061 |
| 2008/0275647 A1* | 11/2008 | Shin ....................... G01S 15/025 701/301 |
| 2012/0053826 A1 | 3/2012 | Slamka |
| 2013/0093852 A1 | 4/2013 | Ye |

(Continued)

FOREIGN PATENT DOCUMENTS

| KR | 101 321 187 B1 | 10/2013 |
| WO | 2010/142689 A2 | 12/2010 |
| WO | 2012/040703 A2 | 3/2012 |

OTHER PUBLICATIONS

International Search Report and Written Opinion for PCT/US2018/039317 dated Sep. 21, 2018, all pages.

*Primary Examiner* — Hung T Nguyen
(74) *Attorney, Agent, or Firm* — Kilpatrick Townsend & Stockton, LLP

(57) ABSTRACT

Various arrangements for avoiding obstacles for a visually-impaired pedestrian are presented. An m by n matrix of distance measurements may be created using a scanning time of flight (ToF) sensor component for various different directions. The m by n matrix of distance measurements and the m by n direction matrix may be analyzed to identify a first obstacle having a vertical height that differs by at least a predefined threshold measurement from a neighboring second region. Based on identifying the first obstacle, an indication of the first obstacle and an indication of the distance to the first obstacle determined using the m by n matrix of distance indications may be output.

20 Claims, 7 Drawing Sheets

(56) References Cited

U.S. PATENT DOCUMENTS

2013/0216093 A1\* 8/2013 Lee .................. A61H 3/061
                                             382/103
2013/0220392 A1\* 8/2013 Gassert ............ A61H 3/061
                                              135/66

\* cited by examiner

SCANNING OBSTACLE SENSOR FOR THE VISUALLY IMPAIRED

BACKGROUND

When travelling on foot, a visually-impaired person (e.g., a person who is blind or cannot otherwise have his eyesight corrected to a near "normal" level) may use a walking cane (often referred to as a "white cane") to detect where obstacles are in his path. The visually-impaired person may move the walking cane from side to side along the ground as he walks forward to locate obstacles, such as curbs, uneven surfaces, sewers, sidewalk ramps, etc. While such a method of detecting obstacles has served the visually-impaired reasonably well, such a walking cane gives the visually-impaired person a relatively limited understanding of the terrain and obstacles nearby.

SUMMARY

Various embodiments are described related to a visually-impaired pedestrian multi-axis obstacle sensing system. In some embodiments, a system for a visually-impaired pedestrian multi-axis obstacle sensing system is described. The system may include a scanning time of flight (ToF) sensor component that determines a distance from the scanning ToF sensor component to a nearest object for an m by n direction matrix. M is greater than 1 and n is greater than 1. The system may include a processor, in communication with the scanning ToF sensor component, that receives an m by n matrix of distance indications. Each distance indication of the m by n matrix of distance indications may correspond to a direction of the m by n matrix of directions. The processor may analyze the m by n matrix of distance indications and the m by n direction matrix to identify an obstacle having a vertical height that differs by at least a predefined threshold measurement from a second region. The processor, based on identifying the obstacle, may output an indication of the obstacle and an indication of the distance for the obstacle determined from the m by n matrix of distance indications to an output component. The system may include an output device in communication with the processor that receives the indication of the obstacle and the indication of the distance to the region and provides an output representative of the obstacle, a direction to the obstacle, and the distance to the obstacle.

Embodiments of such a system may include one or more of the following features: The system may include a walking cane. The walking cane may include a scanning ToF sensor component. The scanning ToF sensor component may be mounted on the walking cane such that the scanning ToF sensor component may be pointed toward a walking path of a visually-impaired pedestrian holding the walking cane. The system may include a wireless network interface. The system may include a global navigation satellite system (GNSS) module. The processor of the GNSS module may transmit, via the wireless network interface, an indication of obstacle and a location of the obstacle determined by the GNSS module to a cloud-based obstacle database. The processor may receive, via the wireless network interface, an indication of a second obstacle in a vicinity of a location of the visually-impaired pedestrian multi-axis obstacle sensing system as determined by the GNSS module. The indication of a second obstacle may be received from the cloud-based obstacle database and the indication may include a direction and distance to the second obstacle. The system may include an output device. The output device may be an audio output device that outputs synthesized speech indicative of the direction and distance to the obstacle. The output device may be a wireless communication interface that transmits synthesized speech indicative of the direction and distance to the obstacle via a wireless communication protocol to an audio output device. The output device may be a touch-based pad comprising a grid of pins, each pin being individually extendable from a surface of the touch-based pad. Extension of at least some of the pins of the grid of pins may be based on the obstacle, the direction of the obstacle, and the distance to the obstacle. The m by n matrix may be at least a 4 by 4 matrix.

In some embodiments, a method for avoiding obstacles for a visually-impaired pedestrian is described. The method may include creating an m by n matrix of distance measurements using a scanning time of flight (ToF) sensor component for an m by n direction matrix; m may be greater than 1 and n may be greater than 1. The method may include analyzing the m by n matrix of distance measurements and the m by n direction matrix to identify a first obstacle having a vertical height that differs by at least a predefined threshold measurement from a neighboring second region. The method, based on identifying the first obstacle, may output an indication of the first obstacle and an indication of the distance to the first obstacle determined from the m by n matrix of distance indications.

Embodiments of such a method may include determining a location of the first obstacle. The method may include transmitting the location of the first obstacle to a cloud-based obstacle database system. The method may include receiving, by a cloud-based obstacle database system, an indication of a location and a movement direction of a visually-impaired pedestrian multi-axis obstacle sensing system. The method may include accessing, by the cloud-based obstacle database system, the cloud-based obstacle database to identify one or more obstacles within a predefined distance of the location along the movement direction. The method may include transmitting, by the cloud-based obstacle database system, an indication of the one or more obstacles to the visually-impaired pedestrian multi-axis obstacle sensing system. The method may include determining, by the visually-impaired pedestrian multi-axis obstacle sensing system, that the indication of the one or more obstacles received from the cloud-based obstacle database correspond to a same obstacle as the first obstacle. The method may include receiving, by a cloud-based obstacle database system, an indication of a location and a movement direction of a snowplow apparatus. The method may include accessing, by the cloud-based obstacle database system, the cloud-based obstacle database to identify one or more obstacles within a predefined distance of the location along the movement direction. The method may include transmitting, by the cloud-based obstacle database system, an indication of the one or more obstacles to the snowplow apparatus. The method may include, in response to receiving the indication of the one or more obstacles to a snowplow apparatus, adjusting, by the snowplow apparatus, a height of a snowplow blade. The method may include outputting the indication. Outputting the indication of the first obstacle and the indication of the distance to the first obstacle determined from the m by n matrix of distance indications may be performed using synthesized speech. Outputting the indication of the first obstacle and the indication of the distance to the first obstacle determined from the m by n matrix of distance indications may be performed by adjusting an extension of individual pins of an m by n pin matrix of a touch-based pad user interface.

In some embodiments, a system for a visually-impaired pedestrian multi-axis obstacle sensing system is described. The system may include a cloud-based obstacle database system. The system may include a visually-impaired pedestrian multi-axis obstacle sensing device. The device may include a global navigation satellite system (GNSS) module. The device may include a wireless communication interface that communicates with the cloud-based obstacle database system. The device may include a scanning time of flight (ToF) sensor component that determines a distance from the scanning ToF sensor component to a nearest object for an m by n direction matrix. The device may include a processor in communication with the scanning ToF sensor component, that receives an m by n matrix of distance indications. Each distance indication of the m by n matrix of distance indications may correspond to a direction of the m by n matrix of directions. The processor may analyze the m by n matrix of distance indications and the m by n direction matrix to identify a region having a vertical height that differs by at least a predefined threshold measurement from a second region. The processor, based on identifying the region, may output an indication of the region and an indication of the distance for the region determined from the m by n matrix of distance indications to an output component. The device may include an output device in communication with the processor that receives the indication of the region and indication of the distance to the region and provides a non-visual output representative of the region, a direction to the region, and the distance to the region. The processor may transmit, via the wireless communication interface, an indication of the obstacle and a location of the obstacle determined by the GNSS module to the cloud-based obstacle database. The cloud-based obstacle database may receive an indication of a location and a movement direction of a visually-impaired pedestrian multi-axis obstacle sensing system. The cloud-based obstacle database may identify one or more obstacles within a predefined distance of the location along the movement direction. The cloud-based obstacle database may transmit an indication of the one or more obstacles to the visually-impaired pedestrian multi-axis obstacle sensing system.

DETAILED DESCRIPTION

A multi-axis obstacle sensing system may use time of flight (ToF) measurements to detect obstacles. A ToF sensor measures the amount of time it takes emitted light to be reflected from an object along a particular path. A scanning ToF sensor allows the sensor to measure a distance to an object in multiple directions. Such a sensor may be used to determine a distance to objects within a path of a person, such as a visually-impaired person. A visually-impaired person, when travelling on foot, may be using a walking cane. Attached with the walking cane or located on the visually-impaired person ("user" for short) may be one or more scanning ToF sensors. As the user walks, the scanning ToF sensor may make distance measurements in a predefined pattern by scanning in two dimensions, such as in an m by n matrix. These distance measurements may be used to determine a topography of the ground ahead of the user. Based on the distance measurements, a determination may be made that an obstacle is present. An indication of this obstacle may be output to the user, such as in the form of synthesized speech or vibrations.

Gathering such detailed data regarding obstacles encountered by a user may be useful for other users for the same or possibly different users. A cloud-based obstacle tracking and alert system may receive indications of obstacles identified by a multi-axis obstacle sensing system that uses a scanning ToF sensor. These indications may be stored and provided in the form of an alert to a multi-axis obstacle sensing system used by another user when in the same vicinity of the obstacle. Therefore, even if the other user's multi-axis obstacle sensing system did not sense the obstacle, the user can be alerted to the presence of the obstacle.

Various other forms of systems and devices may also benefit from being alerted to obstacles that may affect pedestrians. For example, a plow or snow blower may be used to clear a pedestrian right-of-way such as a sidewalk. However, it may be difficult for a user of the snowplow or snow blower to detect the presence of an obstacle below the snow. Alerts as detailed above may be provided to the user and/or used to directly control an aspect of the plow (e.g., raising the plow blade) or snow blower (e.g., slowing the propulsion system). As another example, an entity, such as an appropriate public works department or property owner, may be alerted about the location of an obstacle, description of the obstacle, and possibly a classification of the obstacle. This may trigger the responsible entity to come and repair or otherwise address the presence of the obstacle.

Figure 1:
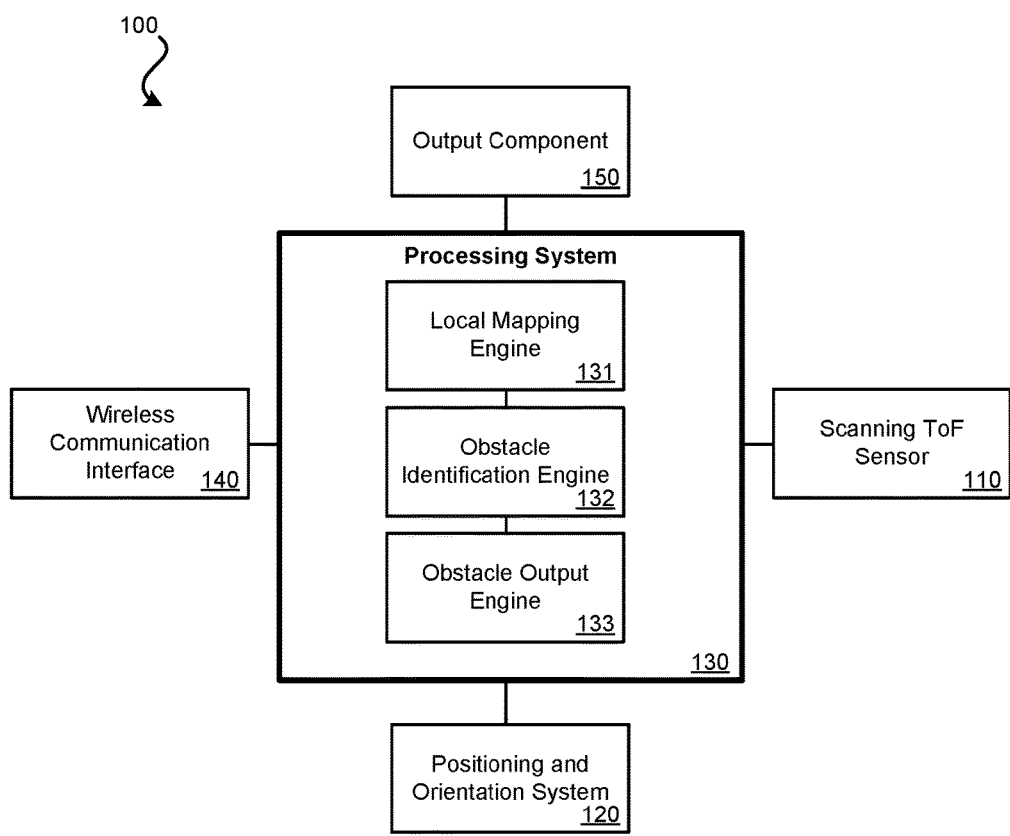
FIG. 1 illustrates an embodiment of a block diagram of a multi-axis obstacle sensing system.

Additional details are provided in relation to the figures. FIG. 1 illustrates an embodiment of a block diagram of a multi-axis obstacle sensing system 100. Multi-axis obstacle sensing system 100 may include scanning ToF sensor 110, positioning and orientation system 120, processing system 130, wireless communication interface 140, and output component 150. Scanning ToF sensor 110 may be able to make distance measurements in multiple directions. Scanning ToF sensor 110 may be able to adjust the direction in which it measures distance along two axes (e.g., vertically and horizontally). Therefore, scanning ToF sensor 110 may be able to produce an m by n matrix of distance measurements that correspond to a grid of directions. For example, a 4×4 matrix of distance measurements may be captured by scanning ToF sensor 110 that corresponds to a 4×4 grid or matrix of directions. In some embodiments, multiple scanning ToF sensors may be present, which may allow for a higher resolution mapping of terrain to be determined.

Positioning and orientation system 120 may be used to determine the location, direction, and velocity of multi-axis obstacle sensing system 100. Positioning and orientation system 120 may include a global navigation satellite system (GNSS) device, such as a global positioning system (GPS) device that can be used to determine an absolute location of multi-axis obstacle sensing system 100, a movement direction, and a velocity of multi-axis obstacle sensing system 100. Positioning and orientation system 120 may include a magnetometer. A magnetometer may be used to determine a direction in which multi-axis obstacle sensing system 100 is pointed. While a GPS sensor may be able to determine a location, the GPS sensor may not be able to determine a direction which multi-axis obstacle sensing system 100 is facing. Additionally or alternatively, an accelerometer and/or gyroscope may be incorporated as part of positioning and orientation system 120. An accelerometer may, for example, be able to determine an orientation of multi-axis obstacle sensing system 100 in relation to the direction of gravity. Such a measurement can be used for determining an angle of scanning ToF sensor 110 with relation to gravity and the ground.

In some embodiments, rather than multi-axis obstacle sensing system 100 having a dedicated positioning and orientation system 120, some or all of the above discussed components may be incorporated as part of a separate device, such as a smartphone. Multi-axis obstacle sensing system 100 may access measurements made by such a separate device in order to decrease the amount of componentry incorporated as part of multi-axis obstacle sensing system 100. For example, via wireless communication interface 140, processing system 130 may receive GPS measurements from a smartphone but may receive orientation and direction measurements from an accelerometer and/or magnetometer of positioning and orientation system 120.

Processing system 130 may include one or more processors and may execute various functions, including local mapping engine 131, obstacle identification engine 132, and obstacle output engine 133. Processing system 130 may include one or more specialized processors that are configured to perform the function of engines 131-133. In other embodiments, processing system 130 may include one or more general purpose processors that execute instructions to perform the function of engines 131-133.

Local mapping engine 131 may analyze distance measurements received from scanning ToF sensor 110. Local mapping engine 131 may create an m by n matrix of distances measurements from the received distance measurements. Local mapping engine 131 may have stored or have access to a corresponding matrix of directions, wherein each distance measurements from the m by n matrix of distance measurements corresponds to an element of an m by n matrix of directions. Local mapping engine 131 may use the m by n matrix of distance measurements and the stored or accessible m by n matrix of directions to create a map of a region in front of multi-axis obstacle sensing system 100. While this document refers to distances and directions being stored in the form of a matrix, it should be understood that this data may be stored in other forms, such as a list of vectors, strings of values, etc. This map may be indicative of the terrain scanned by scanning ToF sensor 110. The map may be a matrix of distance values each associated with a location, such that a three-dimensional terrain map can be interpreted or visualized. To increase the resolution of the map produced by local mapping engine 131, the map produced by local mapping engine 131 may be refined based on measurements by positioning and orientation system 120. For example, if multi-axis obstacle sensing system 100 is mounted to or incorporated into a walking cane, the user of the walking cane may sweep the walking cane from side to side and/or walk. Local mapping engine 131 may track this sweeping movement, translational movement, and/or the tilt applied to multi-axis obstacle sensing system 100 based on measurements from positioning and orientation system 120 (e.g., one or more accelerometers, one or more gyroscopes). Based on repeated measurements made by scanning ToF sensor 110 while the user is moving the walking cane or, more generally, the multi-axis obstacle sensing system 100, local mapping engine 131 may refine and improve the map of the region in front of multi-axis obstacle sensing system 100 to obtain better detail of the terrain and any obstacles present.

Obstacle identification engine 132 may analyze the three-dimensional map produced by local mapping engine 131. Obstacle identification engine 132 may analyze the map for gradients between regions exceeding a particular slope. A sudden increase or decrease in slope between regions on the three-dimensional map may be indicative of the presence of an obstacle. Common obstacles that may be detected can include curbs, uneven sections of sidewalks, cracks, potholes, rocks, gutters, debris, etc. Obstacle identification engine 132 may be configured with one or more threshold obstacle sizes of which the user is to be notified. Such threshold may define obstacle size ranges (e.g., larger than one inch but smaller than five inches) or obstacle limits (e.g., larger than two inches or smaller than five inches). These thresholds may be used to determine whether a detected obstacle qualifies to be identified to a user of multi-axis obstacle sensing system 100.

Obstacle output engine 133 may determine an output to be provided to a user based on the output of obstacle identification engine 132. Obstacle output engine 133 may select a message from a set of predefined messages or may generate a customized message based on the obstacle. Based on the determined location of multi-axis obstacle sensing system 100, the obstacle may be identified by processing system 130. The output of output component 150 may indicate a distance to an obstacle; a direction to an obstacle; and/or a size or height/depth of the obstacle. If output component 150 outputs a synthesized voice message, such a message may state, for example: "Five feet directly in front of you, there is a 6-inch rise off the ground. It is likely a curb." Another example could be: "To the front right of you, the ground slopes down about three inches." Output component 150 may include a speaker that outputs sound and/or synthesized or recorded speech. Output component 150 may be a three-dimensional pad that includes pins that are raised and lowered to represent terrain, as detailed in relation to FIG. 4. Output component 150 may be a local wireless (e.g., BLUETOOTH®) or wired communication interface that communicates with an audio earpiece or headset worn by a user. Output component 150 may in some embodiments include a vibrator. In such embodiments, as the multi-axis obstacle sensing system 100 approaches the obstacle, vibrations may be varied in magnitude and duration to provide the user with information about (e.g., size, location, etc.) of the obstacle.

Wireless communication interface 140 may replace output component 150 if multi-axis obstacle sensing system 100 can solely communicate with a user via a separate wireless device. Wireless communication interface 140 may also be used to communicate with a remote system, such as a cloud-based obstacle tracking and alert system, which is detailed in relation to FIG. 5. Wireless communication interface 140 may communicate with a cloud-based obstacle tracking and alert system via a cellular network (e.g., 3G, LTE, 4G, 5G, etc.) and/or via a dedicated internet of things (IoT) wireless communication network. Such a dedicated IoT wireless communication network may operate at frequencies distinct from voice and message cellular networks. Wireless communication interface 140 may send data regarding obstacles identified by processing system 130, along with positioning and orientation data to a cloud-based obstacle tracking and alert system. Wireless communication interface 140 may also receive obstacle information from a cloud-based obstacle tracking and alert system, which can be analyzed and output by obstacle identification engine 132 and obstacle output engine 133, respectively.

It should be understood that multi-axis obstacle sensing system 100 may include various computerized components that are omitted for simplicity. For example, memories, data storage arrangements (e.g., hard drives), data interfaces, additional user interfaces, power supplies, and data buses are examples of components that may be present that are not specifically described.

Figure 2:
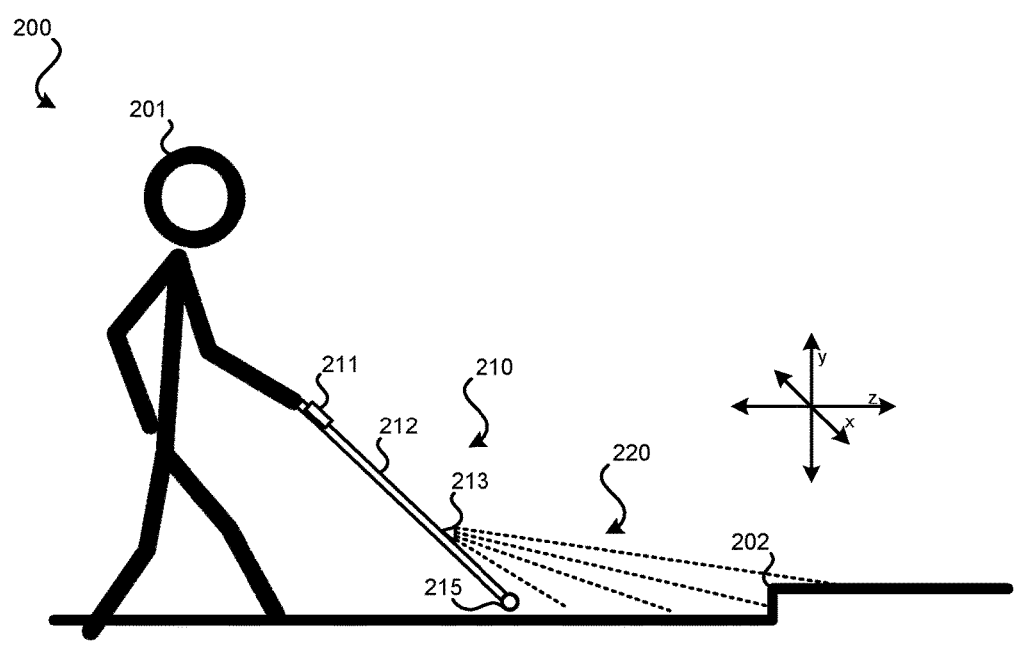
FIG. 2 illustrates an embodiment of a multi-axis obstacle sensing system incorporated with a walking cane.

FIG. 2 illustrates an embodiment 200 of a multi-axis obstacle sensing system incorporated with a walking cane 210. Walking cane 210 can illustrate an embodiment of multi-axis obstacle sensing system 100 of FIG. 1 incorporated with a walking cane for a visually-impaired person, user 201. In other embodiments, multi-axis obstacle sensing system 100 may function independently of a walking cane, such as by being carried or worn by user 201. Scanning ToF sensor 213 of the multi-axis obstacle sensing system may be located on shaft 212 a distance from ground contact 215. By being a distance from ground contact 215, when walking cane 210 is held by user 201, scanning ToF sensor 213 may scan at multiple distances in front of user 201 and from side to side. The specific location of scanning ToF sensor 213 may be adjusted by a user based on factors such as the height of user 201 and the angle at which user 201 tends to hold walking cane 210.

Scanning ToF sensor 213 may detect obstacle 202, which could be a step, curb, or uneven surface. The processing system of the multi-axis obstacle sensing system may be housed by housing 211. Housing 211 may also include an output component that outputs an indication of obstacle 202 via sound, speech, vibration, or touch (such as detailed in relation to FIG. 4).

Scanning ToF sensor 213 may alter the direction in which it measures distance by various angles in the y-z plane of the illustrated axis, as illustrated by distance paths 220. Scanning ToF sensor 213 may also alter the direction in which it measures distance by various angles in x-z plane of the illustrated axis. As the user walks forward and/or moves walking cane 210 side to side, the direction in which distance is measured may effectively be increased.

Figure 3:
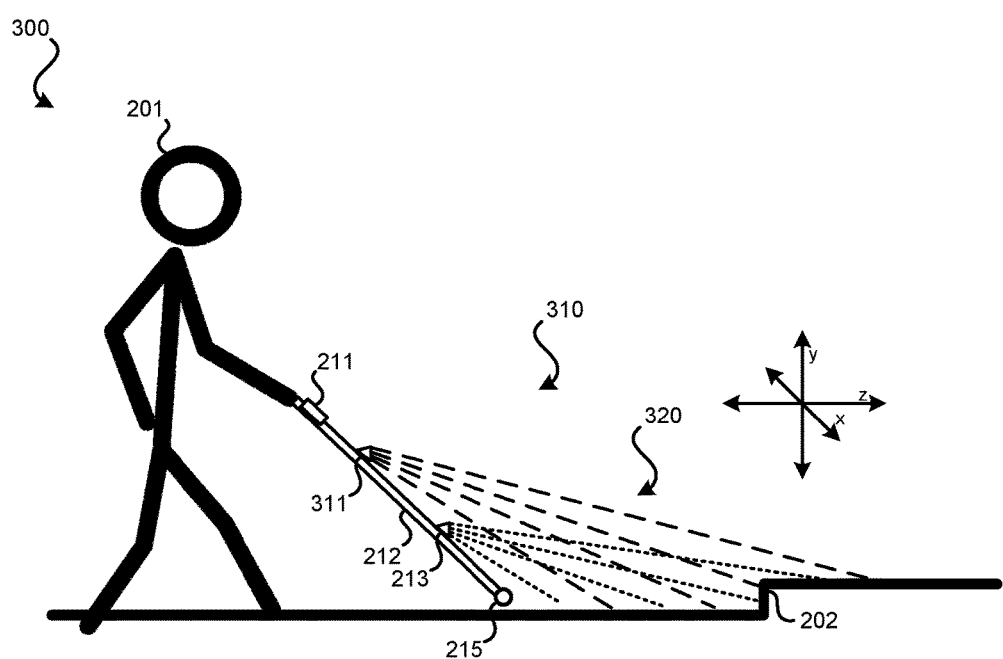
FIG. 3 illustrates another embodiment of a multi-axis obstacle sensing system incorporated with a walking cane.

FIG. 3 illustrates an embodiment 300 of a multi-axis obstacle sensing system 100 incorporated with a walking cane. Embodiment 300 illustrates an alternative version of multi-axis obstacle sensing system 100 incorporated with walking cane 310. In embodiment 300, multiple scanning ToF sensors (213, 311) are present. Scanning ToF sensors 213 and 311 are distributed at different distances on housing 211 from ground contact 215 and are possibly pointed at different angles. Scanning ToF sensors 213 and 311 may individually produce distance measurements in an m by n matrix. However, the output distance measurements of each ToF sensor may be analyzed together to produce a higher resolution mapping of terrain for obstacle identification. The distance measurement matrix produced by combining the measurement outputs of scanning ToF sensors may be 2 m×2 n.

As can be seen in FIG. 3, the number of distance measurement paths 320 are doubled compared to embodiment 200. Distance measurement paths 320 include distance measurement paths of scanning ToF sensor 311 (represented by long dashed lines) and distance measurement paths of scanning ToF sensor 213 (represented by short dashed lines). Each of these sensors may also scan side to side at the indicated angles in the y-z plane, but at different angles in the x-z plane. In embodiment 300, scanning ToF sensors 311 and 213 are aligned such that distance measurements made by the scanning ToF sensors 311 and 213 are interspersed, effectively raising the resolution of a mapping produced by a local mapping engine of the multi-axis obstacle sensing system. In other embodiments, scanning ToF sensors 311 and 213 may be differently aligned, such that scanning ToF sensor 311 scans a far region and scanning ToF sensor 213 scans a near region.

In embodiment 300, two scanning ToF sensors are used as part of a multi-axis obstacle sensing system. It should be understood that other embodiments may incorporate a greater number of scanning ToF sensors to increase resolution of a mapped region and/or expand the mapped region.

Figure 4:
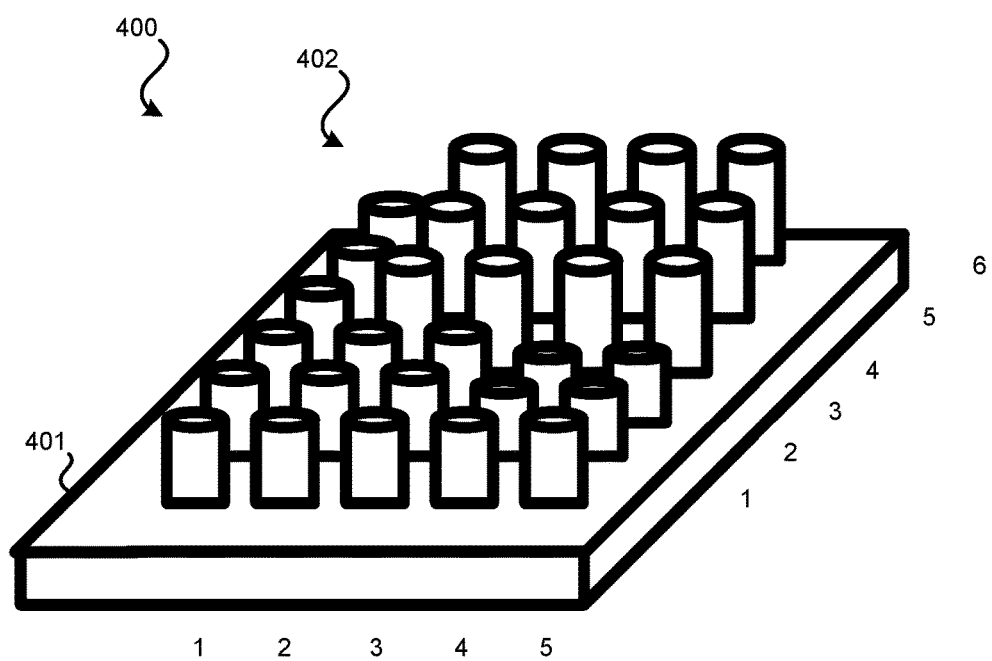
FIG. 4 illustrates an embodiment of a three-dimensional obstacle output interface.

FIG. 4 illustrates an embodiment of a three-dimensional terrain output interface 400. Three-dimensional terrain output interface 400 may be located in a position where a user can touch a surface of pins 402. For example, referring to embodiment 200, three-dimensional terrain output interface 400 may be located on housing 211 and may serve as the output component of the multi-axis obstacle sensing system. In other embodiments, three-dimensional terrain output interface 400 may be present on a hand-held remote device or a wearable device. The height of pins 402 from surface 401 may be adjusted based on data from processing system 130 to correspond to distance measurements made by one or more scanning ToF sensors. For example, the embodiment of multi-axis obstacle sensing system of which three-dimensional terrain output interface 400 is a part may produce a 5×6 matrix of distance measurements. Such a matrix of pins may provide a user with information more efficiently than audio or vibration-based communication components. For example, based on the illustrated configuration of pins 402, a user may feel that in the distance, to the center and right, a raised obstacle is present (as indicated by raised pins 3-4 (column, row), 3-5, 3-6, 4-4, 4-5, 4-6, 5-4, 5-5, and 5-6. Nearer to the user than the raised obstacle and not extending as far to the left, is a depressed region indicated by pins 4-2, 4-3, 5-2, and 5-3. As the user walks toward these obstacles, pins 402 may be adjusted as additional distance measurements are made by the scanning ToF sensor such that the obstacles become indicated by pins in lower-numbered rows. Further, as the user moves the scanning ToF sensor from side to side, the columns in which the obstacles are represented may similarly shift from side to side, allowing a user to explore the region around the obstacles via three-dimensional terrain output interface 400.

A single pin may be used for each distance measurement made by one or more scanning ToF sensors. Therefore, embodiments of three-dimensional terrain output interface 400 may contain only a small number of pins (e.g., 4) or a much higher number of pins if a more detailed mapping of the terrain near the user is created (e.g., 100 pins). In some embodiments, even if a scanning ToF sensor can only capture distance measurements in a small number of directions, by the user moving forward and moving the multi-axis obstacle sensing system from side to side, the resolution of the terrain may be significantly enhanced to allow for the terrain to be accurately represented using a higher number of pins.

Figure 5:
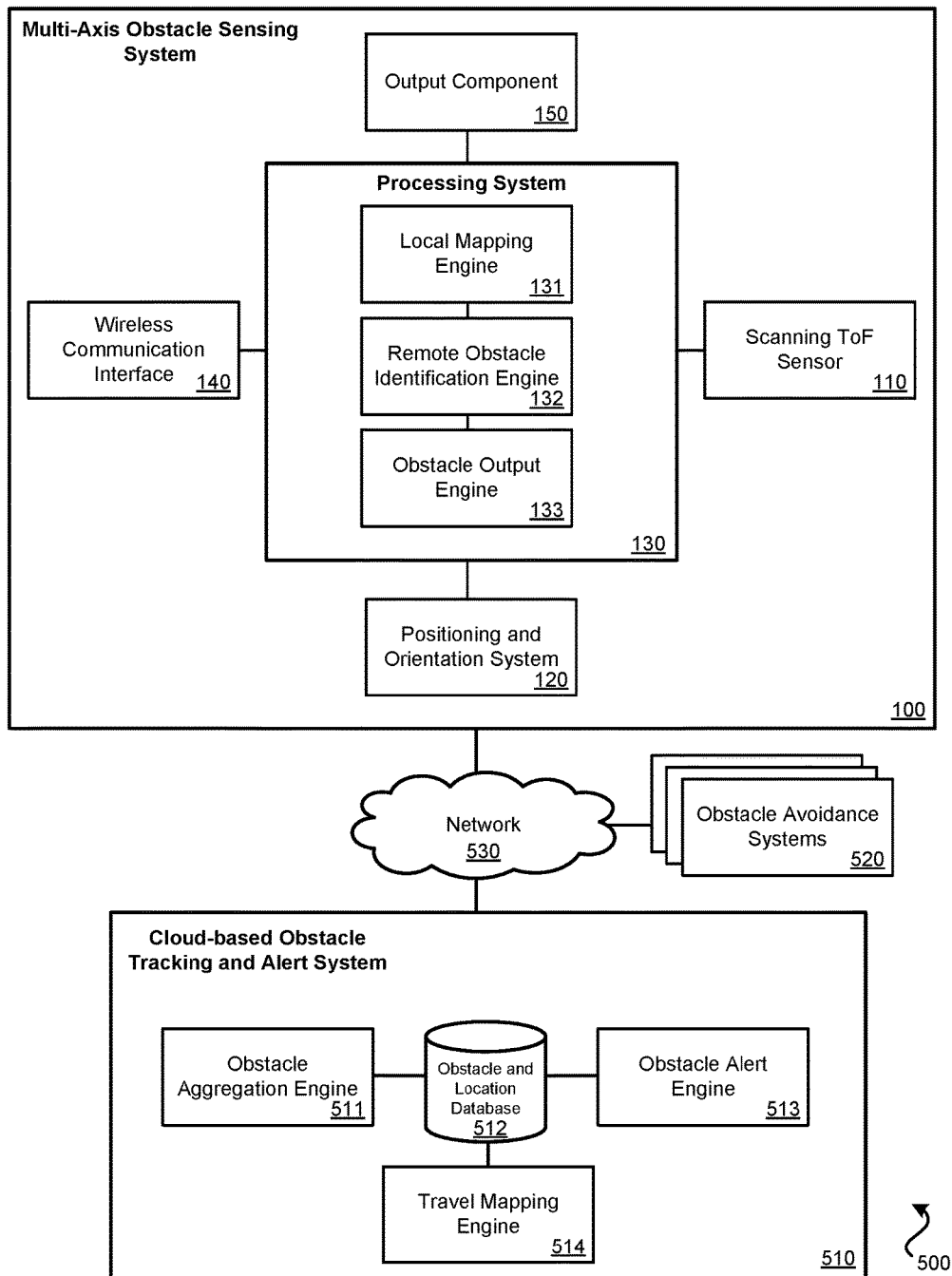
FIG. 5 illustrates an embodiment of a block diagram of a cloud-based obstacle mapping system.

FIG. 5 illustrates an embodiment of a block diagram of a cloud-based obstacle mapping system 500. Cloud-based obstacle mapping system 500 may include one or more multi-axis obstacle sensing systems, such as multi-axis obstacle sensing system 100. Multi-axis obstacle sensing system 100, as detailed in relation to FIG. 1, may be in communication via network 530 with a cloud-based obstacle tracking and alert system 510. Network 530 may represent the Internet, a dedicated wireless IoT communication network, a cellular network, and/or some combination thereof.

Cloud-based obstacle tracking and alert system 510 may be in communication with many multi-axis obstacle sensing systems, such as multi-axis obstacle sensing system 100. Cloud-based obstacle mapping system 500 may receive obstacle data from the various multi-axis obstacle sensing systems and provide obstacle data to such devices. Cloud-based obstacle mapping system 500 may include: obstacle aggregation engine 511, obstacle and location database 512, obstacle alert engine 513, and travel mapping engine 514. Obstacle aggregation engine 511 may receive indications of obstacles from various multi-axis obstacle sensing systems via network 530. These indications of obstacles may include a description of the obstacle based on a mapping indicative of the obstacle produced by obstacle identification engine 132 and a location of the obstacle, such as in the form of GPS coordinates. Obstacle aggregation engine 511 may receive indications of obstacles (such as obstacles larger than a predefined threshold) from the various obstacle output engines of multi-axis obstacle sensing systems, compare the associated locations, and if the obstacle size or description and location match within defined threshold, the obstacles may be treated as a single obstacle and may be stored as a single obstacle in obstacle and location database 512.

Obstacle and location database 512 may store descriptions of obstacles (e.g., size, shape, etc.) along with an associated location. If the type of obstacle is known, the type may be stored in association with the description (e.g., curb, hole, uneven sidewalk, etc.). Obstacle alert engine 513 may receive location and direction information from multi-axis obstacle sensing system 100 and other multi-axis obstacle sensing systems. This location and direction information may be used by obstacle alert engine 513 to access obstacle and location database 512 to determine if the multi-axis obstacle sensing system is approaching any obstacles based on its location and direction. If, within a threshold distance, the multi-axis obstacle sensing system is moving near an obstacle stored by obstacle and location database 512, obstacle alert engine 513 may send data indicative of the obstacle (description, location, etc.) to the multi-axis obstacle sensing system. Upon receipt, obstacle identification engine 132 may store and compare this received obstacle information with any obstacles it is detecting within the map based on location, size, shape, etc. If a match is present, the obstacle may be identified to the user with a high degree of certainty, which may affect the content of the output message: "There is definitely a crack in the sidewalk ahead." If no match is present, the information may still be output but with a lower degree of confidence, for example, the message may indicate "Other devices have reported a crack in the sidewalk ahead, but I haven't been able to detect it." If the obstacle identification engine 132 detects an obstacle that does not have a match obtained from obstacle alert engine 513, the message may, for example, indicate "I see an obstacle ahead, this obstacle does not seem to have been present for other users."

Obstacle alert engine 513 may also send obstacle alert information in response to location and, possibly, direction data from other forms of devices and system than multi-axis obstacle sensing systems. Obstacle avoidance systems 520 may be incorporated as part of various types of devices and systems that may travel along the same regions as multi-axis obstacle sensing system. For instance, in winter, a small plow may be used to clear a path on a sidewalk or walkway. Such a plow may have an integrated obstacle avoidance system of obstacle avoidance systems that allows for obstacle data obtained from obstacle alert engine 513 to be presented to a user; or the system or device, such as the plow, to be controlled based on the obstacle data. Referring to the example of a plow, if an obstacle is approached, which may be hidden under the snow, a blade of the plow may be raised or the propulsion system of the plow may be slowed or stopped to prevent or decrease the severity of an impact with the obstacle. Besides plows, various other devices or systems may have an incorporated obstacle avoidance system that utilizes data gathered via multi-axis obstacle sensing systems. Alternatively, an entity may have a system that receives notifications about the presence of obstacles, such as to facilitate the entity repairing the obstacle.

Travel mapping engine 514 may use data from obstacle and location database 512 to help determine travel routes. Via a mobile device or through an interface of multi-axis obstacle sensing system 100, a user may submit a request indicating a start location and an end location. While many mapping services are available, such as Google Maps, such mapping arrangements may not take into account the number and severity of obstacles, particularly in pedestrian right-of-ways. Travel mapping engine 514 may identify a recommended path from a start point to an end point along a pedestrian right-of-way based on data from obstacle and location database 513. This recommended path may be identified by weighing: distance, numbers of obstacles along the path, types of obstacles, and severity of obstacles. Travel mapping engine 514, as part of a recommended route or separately, may recommend one particular side of a street over the other due to obstacles. For instance, obstacles on one side of the street may be fewer and/or less severe.

In some embodiments, even if a user has not input a destination, travel mapping engine 514 may provide a recommendation for output to a user to multi-axis obstacle sensing system 100 or a mobile device linked with the user. For instance, if cloud-based obstacle tracking and alert system 510 receives a location and direction of movement from multi-axis obstacle sensing system 100, travel mapping engine 514 may determine that the user is walking west along the north side of a street. Travel mapping engine 514 may access obstacle and location database 512 to determine that the north side of the street has a greater number of obstacles than the south side of the street. In response, travel mapping engine 514 may cause a notification be output to the user by multi-axis obstacle sensing system 100 recommended he switch sides of the street.

It should be understood that cloud-based obstacle tracking and alert system 510 may include various computerized components that are omitted for simplicity. For example, memories, data storage arrangements (e.g., hard drives), data interfaces, additional user interfaces, network interfaces, power supplies, and data buses are examples of components that may be present that are not specifically described.

Figure 6:
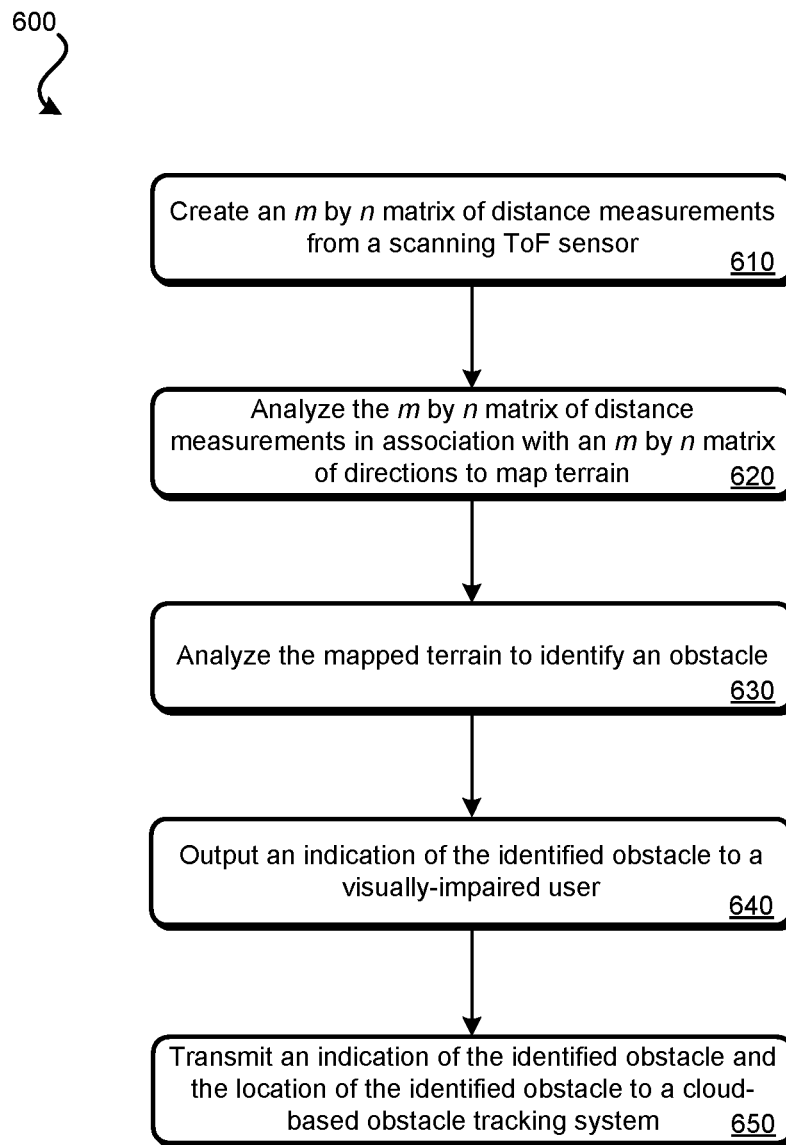
FIG. 6 illustrates an embodiment of a method for using a multi-axis obstacle sensing system.

FIG. 6 illustrates an embodiment of a method 600 for using a multi-axis obstacle sensing system. Method 600 may be performed using the systems and devices detailed in relation to FIGS. 1-4. Each block of method 600 may be performed by a multi-axis obstacle sensing system, such as multi-axis obstacle sensing system 100 of FIG. 1.

At block 610, an m by n matrix of distance measurements may be created based on distance measurements obtained from a scanning ToF sensor. Each of these distance measurements may be made in a different direction. At block 620, the m by n matrix of distance measurements may be analyzed in association with an m by n matrix of directions in which the matrix of distance measurements were obtained to map terrain in front of the multi-axis obstacle sensing system.

At block 630, the map terrain may be analyzed to identify whether an obstacle is present. An obstacle or obstacle region may be identified based on a difference in height of adjacent matrix values of the region scanned being greater than a threshold value. Therefore, if two adjacent distance measurements from the m by n matrix differ by a threshold amount, this may be determined to be indicative of an obstacle or obstacle region being present. In other embodiments, at block 620 the m by n matrix of distance measurements is used to build a more detailed mapping of the terrain as the multi-axis obstacle sensing system is moved forward and/or side to side. Therefore, the distance measurements from the m by n matrix may be used to create a larger, higher resolution matrix that is associated with a similar, higher resolution m by n matrix of directions. In some embodiments, rather than analyzing adjacent matrix values for at least a threshold difference in height to identify an obstacle or obstacle region, a magnitude of slope or trend over several matrix values that meets a threshold may be identified as an obstacle.

At block 640, an indication of the identified obstacle or region from block 630 may be output to the visually-impaired user. As previously detailed, the indication of the identified obstacle may include a description of the obstacle or region (e.g., size, shape, name, etc.), a direction of the obstacle, and/or a distance to the obstacle. The indication may be output in the form of synthesized speech, sound, vibration, or via a three-dimensional interface which a user can touch to determine the presence of the obstacle. In some embodiments, at block 650, an indication of the identified obstacle and its location may be transmitted to a cloud-based obstacle tracking system.

Figure 7:
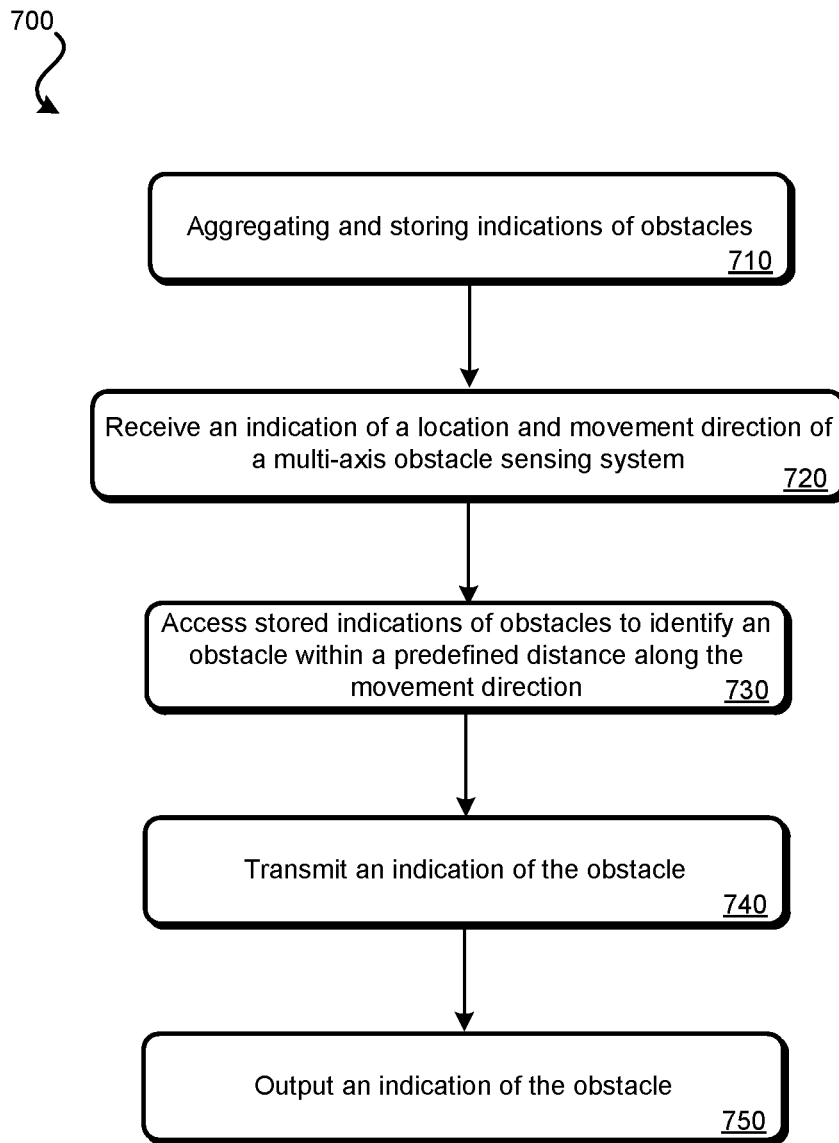
FIG. 7 illustrates an embodiment of a method for building and using an obstacle map.

FIG. 7 illustrates an embodiment of a method 700 for building and using an obstacle map. Method 700 may be performed using the systems and devices detailed in relation to FIGS. 1-5. Each block of method 700 may be performed by a cloud-based obstacle tracking and alert system, such as cloud-based obstacle tracking and alert system 510 of FIG. 5. Method 700 may be performed following method 600 of FIG. 6.

At block 710, indications of obstacles may be aggregated and stored. These indication of obstacles may be received from multi-axis obstacle sensing systems such as the multi-axis obstacle sensing system that performed block 650 of method 600. Each indication of an obstacle may be received in association with a location at block 720 and possibly details about the obstacle, such as size, shape, and possibly a name. Aggregation of obstacle indications may include comparing the received indication of an obstacle with a previously stored indication of an obstacle and comparing their location, size, and shape. If location, size, and/or shape thresholds are met, it may be determined that the multiple instances of obstacles are indicative of the same obstacle.

At block 730, the stored indication of obstacles, which may be stored in a database such as obstacle and location database 512, may be accessed to identify whether one or more obstacles are present within a predefined distance along the movement direction of a multi-axis obstacle sensing system or some other device or system equipped with an obstacle avoidance system. The obstacle avoidance system or the multi-axis obstacle sensing system may occasionally or periodically provide the cloud-based obstacle tracking alert system with a position and direction which may be used at block 730 to identify any stored indication of obstacles that fall within the path of either the obstacle avoidance system or the multi-axis obstacle sensing system.

At block 740, an indication of the obstacle may be transmitted to the device from which positioning data was received. The indication of the obstacle may include a location of the obstacle, a size of the obstacle, a shape of the obstacle, and/or a description of the obstacle. At block 750, the device that receives the indication of the obstacle may output at least some of the received information to a user or may control the device or system in accordance with the received information, such as by stopping propulsion of the device or system or performing some other action, such as by raising the blade of a snowplow.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A visually-impaired pedestrian multi-axis obstacle sensing system, comprising:
 a scanning time of flight (ToF) sensor component that determines a distance from the scanning ToF sensor component to a nearest object for an m by n direction matrix, wherein m is greater than 1 and n is greater than 1;

a processor, in communication with the scanning ToF sensor component, that accesses an m by n matrix of distance indications, wherein each distance indication of the m by n matrix of distance indications corresponds to a direction of the m by n matrix of directions, wherein the processor is configured to:

analyze the m by n matrix of distance indications and the m by n direction matrix to identify an obstacle having a vertical height that differs by at least a predefined threshold measurement from a region; and based on identifying the obstacle, output an indication of the obstacle and an indication of the distance for the obstacle determined from the m by n matrix of distance indications to an output component; and an output device in communication with the processor that receives the indication of the obstacle and the indication of the distance to the region and provides an output indicative of at least a direction to the obstacle and the distance to the obstacle.

2. The visually-impaired pedestrian multi-axis obstacle sensing system of claim 1, further comprising a walking cane, wherein the scanning ToF sensor component is mounted on the walking cane such that the scanning ToF sensor component is pointed toward a walking path of a visually-impaired pedestrian holding the walking cane.

3. The visually-impaired pedestrian multi-axis obstacle sensing system of claim 1, further comprising a wireless network interface.

4. The visually-impaired pedestrian multi-axis obstacle sensing system of claim 3, further comprising a global navigation satellite system (GNSS) module, wherein the processor is further configured to transmit, via the wireless network interface, an indication of a location of the obstacle determined using the GNSS module and the scanning TOF sensor component to a cloud-based obstacle database.

5. The visually-impaired pedestrian multi-axis obstacle sensing system of claim 4, wherein the processor is further configured to receive, via the wireless network interface, an indication of a second obstacle in a vicinity of a location of the visually-impaired pedestrian multi-axis obstacle sensing system as determined by the GNSS module, wherein the indication of the second obstacle is received from the cloud-based obstacle database and the indication includes a direction and distance to the second obstacle.

6. The visually-impaired pedestrian multi-axis obstacle sensing system of claim 1, wherein the output device is an audio output device that outputs synthesized speech indicative of the direction and distance to the obstacle.

7. The visually-impaired pedestrian multi-axis obstacle sensing system of claim 1, wherein the output device is a wireless communication interface that transmits synthesized speech indicative of the direction and distance to the obstacle via a wireless communication protocol to an audio output device.

8. The visually-impaired pedestrian multi-axis obstacle sensing system of claim 1, wherein the output device is a touch-based pad comprising a grid of pins, each pin being individually extendable from a surface of the touch-based pad, wherein extension of at least some of the pins of the grid of pins is based on the obstacle, the direction to the obstacle, and the distance to the obstacle.

9. The visually-impaired pedestrian multi-axis obstacle sensing system of claim 1, wherein the m by n matrix is at least a 4 by 4 matrix.

10. A method for avoiding obstacles for a visually-impaired pedestrian, the method comprising:

creating an m by n matrix of distance measurements using a scanning time of flight (ToF) sensor component for an m by n direction matrix, wherein m is greater than 1 and n is greater than 1;

analyzing, by one or more processors, the m by n matrix of distance measurements and the m by n direction matrix to identify a first obstacle having a vertical height that differs by at least a predefined threshold measurement from a neighboring region; and based on identifying the first obstacle, outputting, via an output device that is in communication with the one or more processors, an indication of the distance to the first obstacle determined from the m by n matrix of distance indications.

11. The method for avoiding obstacles for the visually-impaired pedestrian of claim 10, further comprising:

determining a location of the first obstacle; and transmitting the location of the first obstacle to a cloud-based obstacle database system.

12. The method for avoiding obstacles for the visually-impaired pedestrian of claim 10, further comprising:

receiving, by a cloud-based obstacle database system, an indication of a location and a movement direction of a visually-impaired pedestrian multi-axis obstacle sensing system;

accessing, by the cloud-based obstacle database system, a cloud-based obstacle database to identify one or more obstacles within a predefined distance of the location along the movement direction; and transmitting, by the cloud-based obstacle database system, an indication of the one or more obstacles to the visually-impaired pedestrian multi-axis obstacle sensing system.

13. The method for avoiding obstacles for the visually-impaired pedestrian of claim 12, further comprising:

determining, by the visually-impaired pedestrian multi-axis obstacle sensing system, that the indication of one or more obstacles received from the cloud-based obstacle database correspond to the same obstacle as the first obstacle.

14. The method for avoiding obstacles for the visually-impaired pedestrian of claim 10, further comprising:

receiving, by a cloud-based obstacle database system, an indication of a location and a movement direction of a snowplow apparatus;

accessing, by the cloud-based obstacle database system, the cloud-based obstacle database to identify one or more obstacles within a predefined distance of the location along the movement direction; and transmitting, by the cloud-based obstacle database system, an indication of the one or more obstacles to the snowplow apparatus.

15. The method for avoiding obstacles for the visually-impaired pedestrian of claim 13, further comprising:

in response to receiving the indication of the one or more obstacles to a snowplow apparatus, adjusting, by the snowplow apparatus, a height of a snowplow blade.

16. The method for avoiding obstacles for the visually-impaired pedestrian of claim 10, wherein outputting the indication of the first obstacle and the indication of the distance to the first obstacle determined from the m by n matrix of distance indications is performed using synthesized speech.

17. The method for avoiding obstacles for the visually-impaired pedestrian of claim 10, wherein outputting the indication of the first obstacle and the indication of the distance to the first obstacle determined from the m by n matrix of distance indications is performed by adjusting an extension of individual pins of an m by n pin matrix of a touch-based pad user interface.

18. A visually-impaired pedestrian multi-axis obstacle sensing system, comprising:
   a cloud-based obstacle database system; and
   a visually-impaired pedestrian multi-axis obstacle sensing device, comprising:
      a global navigation satellite system (GNSS) module;
      a wireless communication interface that communicates with the cloud-based obstacle database system;
      a scanning time of flight (ToF) sensor component that determines a distance from the scanning ToF sensor component to a nearest object for an m by n direction matrix, wherein m is greater than 1 and n is greater than 1;
      a processor, in communication with the scanning ToF sensor component, that receives an m by n matrix of distance indications, wherein each distance indication of the m by n matrix of distance indications corresponds to a direction of the m by n matrix of directions, wherein the processor is configured to:
         analyze the m by n matrix of distance indications and the m by n direction matrix to identify a first region having a vertical height that differs by at least a predefined threshold measurement from a second region; and
         based on identifying the first region, output an indication of the first region and an indication of the distance to the first region determined from the m by n matrix of distance indications to an output component; and
      an output device in communication with the processor that receives the indication of the first region and the indication of the distance to the first region and provides a non-visual output representative of the first region, a direction to the first region, and the distance to the first region.

19. The visually-impaired pedestrian multi-axis obstacle sensing system of claim 18, wherein the processor is further configured to:
   transmit, via the wireless communication interface, an indication of the obstacle and a location of the obstacle determined by the GNSS module to the cloud-based obstacle database.

20. The visually-impaired pedestrian multi-axis obstacle sensing system of claim 19, wherein the cloud-based obstacle database system is configured to:
   receive an indication of a location and a movement direction of a visually-impaired pedestrian multi-axis obstacle sensing system;
   access a cloud-based obstacle database to identify one or more obstacles within a predefined distance of the location along the movement direction; and
   transmit an indication of the one or more obstacles to the visually-impaired pedestrian multi-axis obstacle sensing system.

* * * * *

UNITED STATES PATENT AND TRADEMARK OFFICE
CERTIFICATE OF CORRECTION

PATENT NO.         : 10,134,304 B1
APPLICATION NO.    : 15/645735
DATED              : November 20, 2018
INVENTOR(S)        : William Michael Beals and Jeffrey Lang McSchooler It is certified that error appears in the above-identified patent and that said Letters Patent is hereby corrected as shown below:

In the Claims

Claim 1, Column 13, Line 7, please delete "them by" and insert -- the $m$ by $n$ --

Claim 9, Column 14, Line 2, please delete "them by" and insert -- the $m$ by $n$ --

Claim 18, Column 15, Line 25, please delete "them by" and insert -- the $m$ by $n$ --

Claim 18, Column 15, Line 27, please delete "them by" and insert -- the $m$ by $n$ --

Signed and Sealed this
Fourteenth Day of April, 2020

Andrei Iancu
*Director of the United States Patent and Trademark Office*